June 24, 1924.
P. SCHAFER
1,498,932
WINDOW VENTILATOR FOR VEHICLE INCLOSURES
Filed Nov. 1, 1923      2 Sheets-Sheet 2
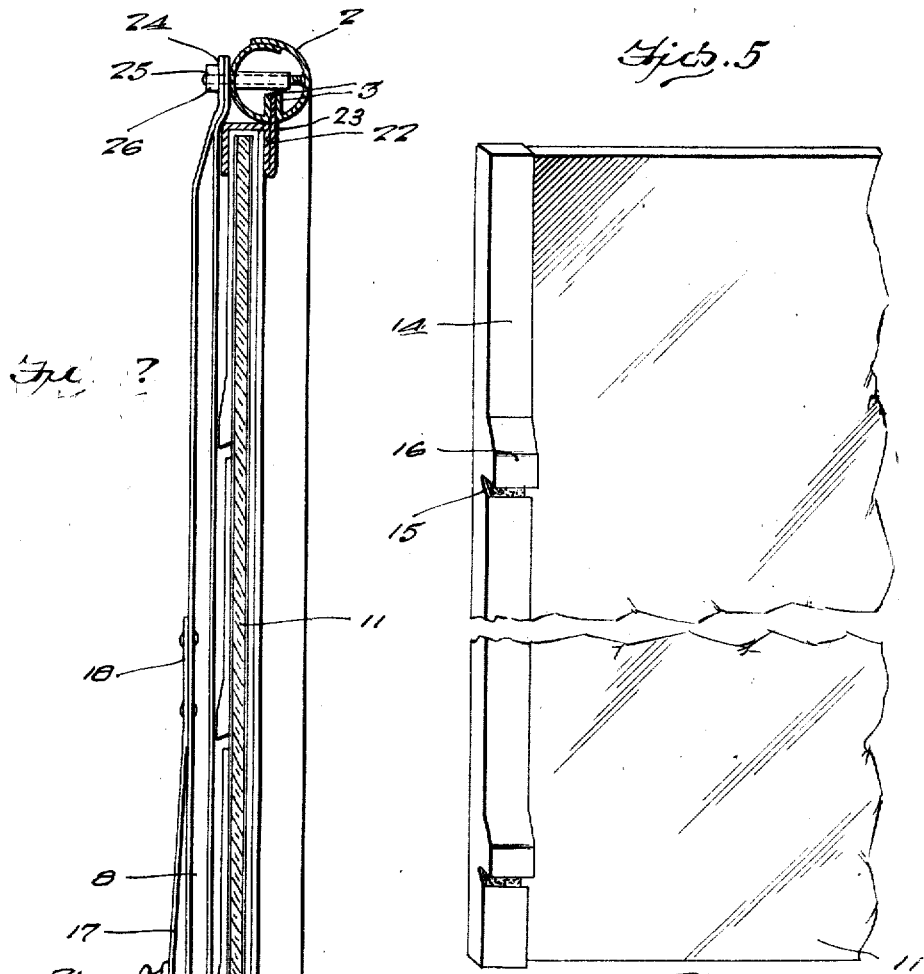
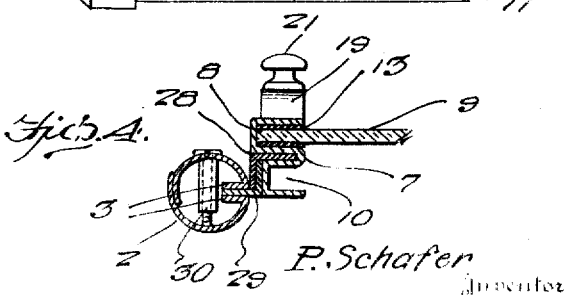

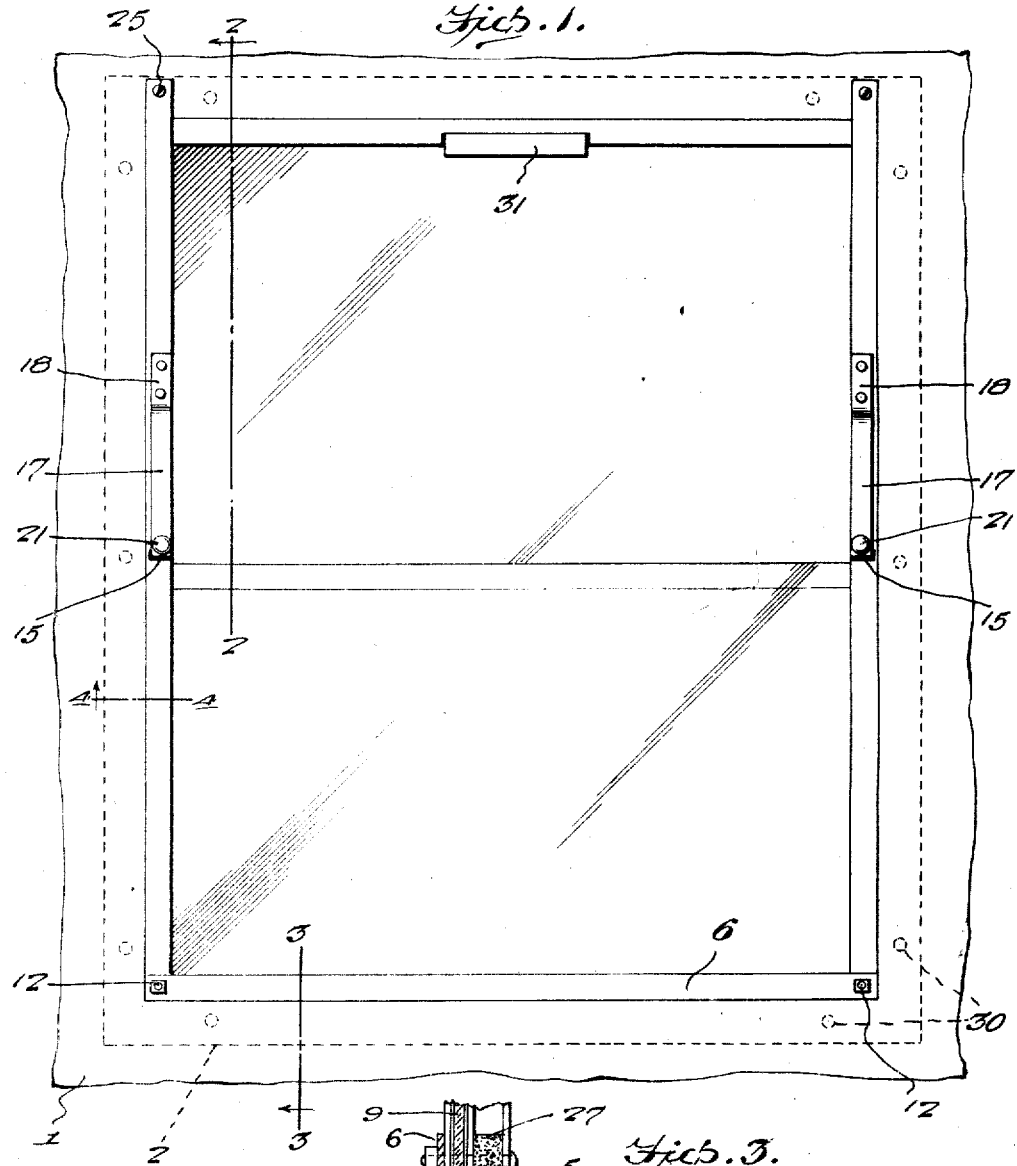

Patented June 24, 1924.

1,498,932

UNITED STATES PATENT OFFICE.

PHILIPP SCHAFER, OF SEYMOUR, INDIANA.

WINDOW VENTILATOR FOR VEHICLE INCLOSURES.

Application filed November 1, 1923. Serial No. 672,137.

*To all whom it may concern:*

Be it known that I, PHILIPP SCHAFER, citizen of the United States, residing at Seymour, in the county of Jackson and State of Indiana, have invented certain new and useful Improvements in Window Ventilators for Vehicle Inclosures, of which the following is a specification.

This invention relates to window structures of automobiles of the closed type and particularly to windows having a pair of glass sections, one of which is adapted for sliding movement to permit a partial opening of the window for ventilating purposes.

An object of the invention is to provide a structure carrying a pair of window sections, one of which is movable relative to the other adapted to be removably secured in water proof relation with a frame carried by the body of the vehicle.

A further object of the invention is the provision of a window carrying frame formed of a plurality of separable strips for mounting a pair of window pane sections, one of which is slidable with respect to the other and adapted for removable connection with a body carried frame in water tight relation, and adapted to be easily removed for permitting the renewal of the window sections.

This invention also includes other objects and improvements in the details of construction and association of parts which is more fully pointed out in the following description and claims, referring to the preferred form of my invention, but it is to be understood that various changes in the details of construction and arrangement of parts may be made without departing from the spirit and scope of this invention.

The invention is illustrated in the accompanying drawings, in which

Figure 1 is an elevational view, looking from the inside of the automobile of my improved window construction in association with the body carried frame of the window.

Figure 2 is a vertical sectional view, of the upper portion of the window frame, taken on the line 2—2 of Figure 1.

Figure 3 is a sectional view, taken on the line 3—3 of Figure 1.

Figure 4 is another sectional view, showing a detail of the frame mounting strip taken on line 4—4 of Figure 1, and Figure 5 is a perspective view of the upper window pane section showing the manner of forming the notched strip through which this pane section is supported in a plurality of predetermined positions.

A portion of the automobile body as indicated at 1 carries a window frame member 2 formed of a pair of rectangular frame sections, of substantially semi-circular cross section adapted for interfitting relation when assembled, and provided with a pair of opposing flanged portions 3 extending outwardly from the inside edges of the members for a purpose to be described. This structure is well known and is at present used in connection with automobile windows for forming a body supported window frame.

The improved window construction is adapted for association with the frame 2 and includes a bottom strip 4 provided at the outside edge with a downwardly extending flange 5 adapted to be secured in the frame 2 between the flanges 3 as clearly shown in Figure 3, and an upwardly extending flange 6 on the rear edge thereof to provide a water tight connection with the frame 2 along the bottom edge of said flange. A pair of side members 7 are each formed of a single strip bent to provide a channel 8 to receive and mount the inner glass section 9 and a channel 10 for slidably mounting the upper glass section 11 and are secured at the lower ends to the flange 6 of the bottom strip member 4 by bolts or the like 12. The channels 8 and the inner glass section 9 are located on the inner side of the frame with respect to the upper glass section, rubber strips 13 being placed against the side edges of the glass 9 within the channels 8, so that the channels may be compressed toward the glass against these rubber strips for permanently or securely holding the glass section 9 in the bottom portion of the frame so that the bottom edge of this glass section will contact with the bottom strip 4 and provide a water tight connection along the bottom of the glass with the strip 4. The upper glass sections 11 are provided at the ends with capping members 14 slidably fitting in the guideways 10 and formed on the inside edge with a plurality of notches 15 inclined downwardly from the inner to the outer ends, at spaced intervals along said cap. Above each notch 15 the cap member 14 is provided with bulge portions 16 for preventing the latch 17 from engaging the said notches on the upward sliding movement of the window 11. The latch 17 is formed of a resilient strip member secured at 18 to the inside of the side member 7, one latch being secured on each side member and provided with an inwardly extending end portion 19 with an upwardly curved terminal adapted for engagement in the slot 15 extending through openings 20 formed in the strip 7 and provided with a handle 21 for the purpose of disengaging the end 20 from the slot 15. The slidable window section 11 may be secured in closed or any one of a number of partially opened positions through the cooperation of the latch members 17 with the notches 15 in the cap carried by said window pane. In closed position, the upper end of the window pane 11 fits within a channel strip 22 to provide a substantially weather tight connection between the upper edge of the pane and the top of the frame, said channel strip 22 having an upwardly extending flange 23 positioned between and secured by the flanges 3 on the upper side of said frame section 2. The inner edge of said channel section 22 terminates at each edge adjacent the inner edges of the side members 7 and the upper ends of said side members are provided with terminals 24 above the channel member 22 perforated to receive the bolt 25 by which the side members are secured to the upper portion of the body carried frame 2 through the cooperation of nuts 26 cooperating with the bolts 25.

A cushion 27 is secured at the lower end of the channel 10 in each side bar as shown in Figure 3, for cushioning the window section 11 at the bottom in its sliding movement, and also provides a means for holding the portions of the member 7 forming said channel in spaced relation.

A pair of cooperating angular weather strips cooperate with each side member and the side portions of the body carried frame to form a weather tight connection between the side members and the body. These weather strips comprise angle bars 28 and 29 respectively adapted for association with each side bar, one pair of members being shown in its associated relation with one of the side bars in Figure 4. One flange of the member 28 is mounted in the member 7 between the walls forming the adjacent sides of the channels 8 and 10, the other portion of said angle bar being spaced from the bottom portion of the channel 10 to receive one flange of the angle bar 29, the other flange of the angle bar 29 being secured between the cooperating flanges 3 on the sections of the frame 2, so that the member 28 is carried by the side bar 7, and the member 29 is carried by the frame 2, the two members or bars forming the weather strip slidably fitting with each other, so that the member 7 may be detached from connection with the members 2 by removing the nuts 26 from the bolts 25 and pulling the members 7 outwardly from the frame 2, which will permit the removal of said members after detaching the connection 12 with the bottom strip 4.

In assembling this construction, the caps 14 are applied to the upper glass section 7, and the lower glass section 9 is secured between the side members 7 in the channels 8 so that the lower glass section is ready for positioning with the channel strips or side members in the frame 2 and the upper glass section is slidably positioned within the channel 10 between the side members 7. The sections of the frame 2 are detached, the lower strip 4 is positioned with its flange 5 engaging between the flange 3 along the lower edge of the frame 2, the upper channel strip 22 is positioned with its flange 23 between the flanges 3 of the frame 2 along the upper edge thereof, and the angle members are positioned at each side of the frame 2 with one flange engaging between the flanges 3 of the frame 2. The sections of the frame 2 are then securely locked together by suitable means such as indicated at 30 for locking the several strips in the frame 2 which is carried by the body structure of the automobile. The lower ends of the side member 7 with the lower window section 9 secured therein are positioned in the bottom strip 4 and the bolt 12 applied for locking these side members in connection with the bottom strip as clearly shown in Figure 3, after which the terminals 24 of the side members are applied over the bolts 25 at the upper side of the frame and the nuts 26 applied thereto for firmly fastening the side members to the frame 2, the weather strips 28 and 29 interfitting with each other in the application of the side member 7. The upper window section 11 is lowered within the channels 10 during this application of the side members which it will be noted are positioned on the inside of the body in the frame 2. Through the operation of the latches 17 by the handles 21, the upper window sections may be raised or lowered at will and positioned in any number of partially open positions as well as held in closed position as indicated in Figure 2.

A handle is provided at 31 secured in any suitable manner to the upper edge of the glass plate 11 by which the plate may be raised or lowered.

If it is subsequently desired to replace or remove the glass plates 9 or 11 from the frame, it may be accomplished in a very simple manner by merely removing the nuts 26 from the bolts 25 at the upper ends of the side members and the connections 12 at the lower ends of the side members, after which both window sections and the side strips may be removed from connection with the frame 2 for the purpose desired.

It will be seen, therefore, that the invention is of an exceedingly simple construction, may be manufactured at a small cost, and efficiently and removably mounts a pair of glass window sections, one of which is movable with respect to the other in the usual body window carried frame of the closed type of automobiles.

What is claimed is:

1. A ventilating window for automobiles including a body carried frame, a window carrying frame including a pair of side members having a lower pane section mounted between the lower ends thereof, and an upper frame section slidable therein, means for adjustably positioning the slidable frame in any one of a plurality of predetermined positions in said side members, a bottom flange strip mounted in the body carried frame in the lower portion thereof, means for connecting the bottom ends of said side members to the bottom strip, and means for connecting the upper ends of said side members to the upper portion of the body carried frame for securing said side members and window sections in weather tight relation with said body carried frame.

2. A ventilating window for automobiles including a body carried frame, a window carrying frame having a bottom strip mounted in the lower portion of said body-carried frame, an upper channel portion mounted in the top portion of said body carried frame, a pair of side members having a lower window section mounted between the lower ends thereof, and an upper window section slidably mounted therein, means on said side members cooperating with the upper window section for securing it in a plurality of predetermined positions, a weather strip carried by each side portion of the body carried frame, coperating weather strips carried by each side member, means for removably securing the lower ends of the side members to the bottom strip, and means for removably securing the upper terminals of said side members to the upper portion of the body carried frame for removably securing said window carrying frame in the body carried frame, whereby the lower window section and the bottom strip, the cooperating weather strip, the upper channel strip and the upper window section cooperate in assembled relation when the upper window section is in closed position to form a weather tight window in said body carried frame.

In testimony whereof I affix my signature.

PHILIPP SCHAFER.